United States Patent
Gauthier et al.

(10) Patent No.: US 8,417,433 B2
(45) Date of Patent: Apr. 9, 2013

(54) DYNAMICALLY AUTO-TUNING A GAS TURBINE ENGINE

(75) Inventors: Donald Gauthier, Ocean Ridge, FL (US); Nicolas Demougeot, Jupiter, FL (US); Peter Stuttaford, Jupiter, FL (US); Hany Rizkalla, Stuart, FL (US)

(73) Assignee: Alstom Technology Ltd. (CH)

( * ) Notice: Subject to any disclaimer, the term of this patent is extended or adjusted under 35 U.S.C. 154(b) by 121 days.

(21) Appl. No.: 13/053,910

(22) Filed: Mar. 22, 2011

(65) Prior Publication Data

US 2011/0265487 A1 Nov. 3, 2011

Related U.S. Application Data

(60) Provisional application No. 61/329,837, filed on Apr. 30, 2010.

(51) Int. Cl.
*G06F 19/00* (2011.01)
*G06G 7/70* (2006.01)

(52) U.S. Cl.
USPC .................. 701/100; 60/39.281; 60/773

(58) Field of Classification Search .................. 701/100; 60/39.281, 773
See application file for complete search history.

(56) References Cited

U.S. PATENT DOCUMENTS

| | | | |
|---|---|---|---|
| 3,080,885 A | 3/1963 | Webster et al. | |
| 6,535,124 B1 | 3/2003 | Ditommaso et al. | |
| 6,742,341 B2 | 6/2004 | Ryan et al. | |
| 6,810,655 B2 | 11/2004 | Davis, Jr. et al. | |
| 6,823,675 B2 | 11/2004 | Brunell et al. | |
| 6,877,307 B2 | 4/2005 | Ryan et al. | |
| 6,955,039 B2 | 10/2005 | Nomura et al. | |
| 6,973,791 B2 | 12/2005 | Handelsman et al. | |
| 6,976,351 B2 | 12/2005 | Catharine et al. | |
| 7,024,862 B2 | 4/2006 | Miyake et al. | |

(Continued)

FOREIGN PATENT DOCUMENTS

| | | |
|---|---|---|
| EP | 133148 | 7/2003 |
| EP | 1533569 A1 | 5/2005 |
| EP | 1632718 A2 | 3/2006 |
| GB | 2434437 A | 7/2007 |

OTHER PUBLICATIONS

Office Action in U.S. Appl. No. 12/786,189 dated Sep. 27, 2011, 19 pages.
Final Office Action in U.S. Appl. No. 12/786,189, mailed Mar. 21, 2012, 31 pages.

(Continued)

*Primary Examiner* — Thomas Tarcza
*Assistant Examiner* — Kevin Myhre
(74) *Attorney, Agent, or Firm* — Shook, Hardy & Bacon L.L.P.

(57) ABSTRACT

Tuning processes implemented by an auto-tune controller are provided for measuring and adjusting the combustion dynamics and the emission composition of a gas turbine (GT) engine via a tuning process. Initially, the tuning process includes monitoring parameters, such as combustion dynamics and emission composition. Upon determining that one or more of the monitored parameters exceed a critical value, these "out-of-tune" parameters are compared to a scanning order table. Upon comparison, the first out-of-tune parameter that is matched within the scanning order table is addressed. The first out-of-tune parameter is then plotted as overlaid slopes on respective graphs, where the graph represents a fuel-flow split. Typically, the slopes are plotted as a particular out-of-tune parameter against a particular fuel-flow split. The slopes for each graph are considered together by taking into account the combined impact on each out-of-tune parameter when a fuel-flow split is selected for adjustment.

20 Claims, 9 Drawing Sheets

U.S. PATENT DOCUMENTS

| | | |
|---|---|---|
| 7,188,019 B2 | 3/2007 | Nomura et al. |
| 7,210,297 B2 | 5/2007 | Shah et al |
| 7,234,305 B2 | 6/2007 | Nomura et al. |
| 7,269,952 B2 | 9/2007 | Arar et al. |
| 7,269,953 B2 | 9/2007 | Gadde et al. |
| 7,284,378 B2 | 10/2007 | Amond, III et al. |
| 7,302,334 B2 | 11/2007 | Hook et al. |
| 7,441,398 B2 | 10/2008 | Ziminsky et al. |
| 2003/0014219 A1 | 1/2003 | Shimizu |
| 2004/0011051 A1 | 1/2004 | Ryan et al. |
| 2006/0254279 A1 | 11/2006 | Taware et al. |
| 2007/0113563 A1 | 5/2007 | Mulera et al. |
| 2009/0005952 A1 | 1/2009 | Tonno et al. |
| 2009/0094984 A1 | 4/2009 | Colket |
| 2010/0286890 A1 | 11/2010 | Chandler |

OTHER PUBLICATIONS

International Search Report and Written Opinion, International Application No. PCT/US2010/036069, filed May 25, 2010, 13 pages.

International Search Report and Written Opinion, International Application No. PCT/US2011/033925, filed Aug. 16, 2011, 14 pages.

Notification of Transmittal of International Preliminary Report on Patentability, International Application No. PCT/US2010/036069, mailed Oct. 3, 2011, 33 pages.

| TUNING ORDER TABLE | |
|---|---|
| DESCRIPTION | PARAMETER |
| TUNE1 | "LBO" |
| TUNE2 | "CT" |
| TUNE3 | "HT" |
| TUNE4 | "HHT" |
| TUNE5 | "NX" |
| TUNE6 | "CO" |

| SLOPES TABLE | | |
|---|---|---|
| FOR TTRF BELOW SLOPESTTRF_BREAKPOINT (USER DEFINED) | | |
| FOR PM1 | FOR PM3 | FOR QUAT |
| SLOPENXVSPM1_LO | SLOPENXVSPM3_LO | SLOPENXVSQUAT_LO |
| SLOPECOVSPM1_LO | SLOPECOVSPM3_LO | SLOPECOVSQUAT_LO |
| SLOPELBOVSPM1_LO | SLOPELBOVSPM3_LO | SLOPELBOVSQUAT_LO |
| SLOPECTVSPM1_LO | SLOPECTVSPM3_LO | SLOPECTVSQUAT_LO |
| SLOPEHTVSPM1_LO | SLOPEHTVSPM3_LO | SLOPEHTVSQUAT_LO |
| SLOPEHHTVSPM1_LO | SLOPEHHTVSPM3_LO | SLOPEHHTVSQUAT_LO |
| FOR TTRF ABOVE SLOPESTTRF_BREAKPOINT (USER DEFINED) | | |
| FOR PM1 | FOR PM3 | FOR QUAT |
| SLOPENXVSPM1_HI | SLOPENXVSPM3_HI | SLOPENXVSQUAT_HI |
| SLOPECOVSPM1_HI | SLOPECOVSPM3_HI | SLOPECOVSQUAT_HI |
| SLOPELBOVSPM1_HI | SLOPELBOVSPM3_HI | SLOPELBOVSQUAT_HI |
| SLOPECTVSPM1_HI | SLOPECTVSPM3_HI | SLOPECTVSQUAT_HI |
| SLOPEHTVSPM1_HI | SLOPEHTVSPM3_HI | SLOPEHTVSQUAT_HI |
| SLOPEHHTVSPM1_HI | SLOPEHHTVSPM3_HI | SLOPEHHTVSQUAT_HI |

*FIG. 4.*

DYNAMICALLY AUTO-TUNING A GAS TURBINE ENGINE

CROSS REFERENCE TO RELATED APPLICATIONS

This Nonprovisional Patent Application claims the benefit of U.S. Provisional Application No. 61/329,837, filed Apr. 30, 2010, now pending, entitled "Dynamically Auto-tuning a Gas Turbine Engine," the teachings of which are hereby incorporated by reference in their entirety.

TECHNICAL FIELD

The present invention generally relates to automatically tuning a gas turbine engine. More specifically, a process and system are identified for providing a control system to automatically tune the gas turbine engine by dynamically selecting and adjusting by a single increment a fuel-flow split within a combustor.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

SUMMARY

Increasingly, a control system is used to regulate the operation of the gas turbine engine. In operation, the control system receives a plurality of indications that communicate the current operating conditions of the gas turbine engine including pressures, temperatures, fuel-flow rates, and engine frequencies. In response, the control system makes adjustments to the inputs of the gas turbine engine, thereby changing performance of the gas turbine engine based on the plurality of indications in light of look-up tables coded into the memory of the control system. Over time, this performance may fall outside a preferred operating range due to mechanical degradation of the gas turbine engine or changes in operational conditions such as ambient temperature or fuel constituents. For instance, the gas turbine engine may start operating beyond regulated emissions limits. As such, multiple manual tunings are required to update the control system. Manual tuning is labor intensive and can create business-related inefficiencies, such as extended down-time of the gas turbine engine and operator error in the course of tuning. In addition, because there are specific windows of time where manual tuning may not be available (e.g., high dynamics events), but where performing a tuning operation would be beneficial to protect against potential damage to hardware, automatically tuning during those window will capture those benefits typically missed with manual tuning.

In accordance with the present invention, there is provided a novel way of monitoring operating conditions of a gas turbine engine and responding to conditions which exceed predetermined upper or lower limits. In embodiments, responding to those conditions that exceed the predetermined limits involves, first, identifying those parameters that are out of tune and, second, correcting for the first out-of-tune parameter encountered when scanning through a scanning order table. Typically, the first out-of-tune parameter is corrected with consideration of the other parameters that are identified as being out of tune. In other words, a knowledge of which other parameters are out of tune is applied to select a most advantageous corrective action from a collection of possible corrective actions that influence the first out-of-tune parameter. In this way, the selected corrective action will likely produce the least negative effect on the other identified out-of-tune parameters.

Initially, various engine operating conditions can be monitored. By way of example, these operating conditions may include, but are not limited to, emissions, and combustor dynamics modes, such as Lean Blow Out (LBO), Cold Tone (CT), Hot Tone (HT), and Screech. When a monitored operating condition exceeds one or more of the predetermined upper or lower limits, an engine parameter is changed to adjust this condition to bring it within the limits, thereby "tuning" the gas turbine engine. Generally, a tuned engine functions within an efficient range of operating conditions.

More specifically, pressure-pulse fluctuations, also called combustion dynamics, may be detected (e.g., utilizing pressure transducers) in each combustor of the gas turbine engine and may be communicated as pressure signals. Next, in embodiments, a Fourier Transform or other transformative operation may be applied to the pressure signals, in order to convert the pressure signals into an amplitude versus frequency plot. Upon examination of the amplitude versus frequency plot, an amplitude may be compared against a predetermined upper or lower pressure limit, or alarm level limit.

In another instance, a data point of an emission composition, which is measured directly from the gas turbine engine using a monitoring device (e.g., continuous emission monitoring system (CEMS)), may be read and recorded. By way of example, the emission composition may be measured in units of parts per million (ppm) for each of NOX and CO, while O2 may be measured in percent (%) composition. Once the emission composition is measured, it is compared against a critical (maximum/minimum) value.

Incident to comparison, it may be determined that the upper or lower pressure limit, or critical value, is exceeded by one or more measured parameters. If more than one parameter (e.g., combustion dynamics or emissions composition) measured from the gas turbine engine is out of tune (i.e., exceeding predetermined limits and/or a critical value), the parameters exhibiting the out-of-tune condition are compared against a scanning order table, or scan order table. This table is used to define the order in which the controller scans the six parameters shown in FIG. 3. The order of the parameters is not permanently fixed, but may be established at the time of commissioning of the gas turbine (GT) engine to meet the customer's requirements. Upon scanning the scanning order table, the parameter that is encountered first is assigned a name (OOT1) and is addressed first out of the other out-of-tune parameters (i.e., more emphasis is placed on this parameter). Generally, when addressing the first-encountered parameter, at least one appropriate corrective action is taken. In some instances, the appropriate action is carried out manually. In another instance, the appropriate action is implemented by a control system. For instance, the control system may initiate a process of dynamically selected and adjusting one or more fuel-flow splits within a fuel circuit of the combustor.

In an exemplary embodiment, one fuel-flow split is selected to be automatically adjusted at a time. The process of selection may involve generating a group of plots, where each plot in the group overlays slopes associated with the out-of-tune parameters, respectively, and are each directed to a particular fuel-flow split. Upon evaluation of the group of plots, the particular fuel-flow split that, when adjusted, provides a greatest positive impact to the first-encountered parameter (OOT1) and provides a least negative impact on the other out-of tune parameters is selected.

The selected fuel-flow split is incrementally adjusted a single predefined amount, or a predefined increment. As described herein, the phrase "predefined increment" is not meant to be construed as limiting, but may encompass a wide range of adjustments to the fuel-flow splits. In one instance, the predefined increment is a uniform amount of adjustment that is consistently applied to one or more of the fuel-flow splits. In another instance, the predefined increment is a varied amount of adjustment that is altered across fuel-flow splits or across individual adjustments to a particular fuel-flow split. By altering the increment of the fuel-flow splits in this manner, the fuel-air mixing within the combustor is changed, thus, affecting the combustion dynamics. Also, upon affecting the combustion dynamics, the pressure fluctuations are also altered. The amplitude(s) of the altered pressure fluctuations and/or the data point(s) of the altered emissions composition, as well as the other parameters, once stabilized, are again measured and recorded. These altered parameters are used to recalculate each of the slopes used in the fuel-flow-split plots. Further, these recalculated slopes may be stored within a slopes schedule for future analysis.

In embodiments, the measured amplitude of the altered pressure fluctuations and/or altered emissions composition may be again compared against the predetermined upper or lower limits and/or critical values, respectively, to verify whether the adjusted fuel-flow split has moved the combustion dynamics and/or emissions composition within an acceptable range. If the measured amplitude continues to exceed the predetermined limit(s), or the emissions-composition measurements continue to exceed the critical values, the same or another fuel-flow split may be adjusted by a predefined increment and the process is recursively repeated as necessary. In an exemplary embodiment, adjustments are made to each of the various fuel-flow splits consistently and uniformly (at the same predetermined increment), thereby saving processing time to compute a customized value of an increment each time an adjustment is requested by the control system.

Accordingly, in one exemplary embodiment of the process of auto-tuning, the control system is configured for monitoring and controlling the GT engine. This control system generally manages a majority of the processes involves with auto-tuning the combustor, and may be referred to as an auto-tune controller (see reference numeral 100 of FIG. 1). Initially, the process includes monitoring the combustion dynamics and emissions of the combustor for a plurality of conditions. Upon determination that one or more of the conditions exceeds predetermined limit(s), a fuel-flow split to a fuel circuit is adjusted by the predetermined amount. The control system, or auto-tune controller, continues to monitor the combustion dynamics and to dynamically adjust the fuel-flow split by the predetermined amount until the combustion dynamics fall below the predetermined upper limit.

Further, in another exemplary embodiment of the process of auto-tuning, the GT engine is monitored and, based on the data recovered from monitoring, a fuel-flow split is selected and automatically adjusted a single increment. Generally, the automatic adjustment involves incrementing upward or downward the selected fuel-flow split in order to maintain combustion dynamics and emission composition within a preferred operating range, or above/below a limit.

In particular, this other exemplary process initially includes detecting pressure signals and emission composition of the combustor during the step of monitoring. Subsequent to, or coincident with, the step of monitoring, an algorithm is applied to the detected pressure signals, while the emission composition is read as a percentage or parts per million. In one instance, applying the algorithm involves performing a Fourier Transform on the pressure signals to convert the pressure signals into an amplitude. The amplitude is compared to predetermined limits for different known conditions, while the composition of the emission is compared to respective critical values for particular gasses (e.g., oxygen, carbon dioxide, and nitrous oxide). If it is determined that the amplitude exceeds its respective predetermined limit, or the emission composition surpasses one or more critical values, a fuel-flow split is selected and an incremental adjustment of the selected fuel-flow split is performed. As used herein, the phrase "fuel-flow split" refers to an instruction that governs a portion of a total fuel-flow that is directed to each fuel nozzle of a fuel circuit within the combustor.

Initially, a plurality of slopes are derived upon monitoring parameters during commissioning or general operation of the combustor. These slopes are each formatted as a parameter versus fuel-flow split plot. Typically, these slopes are populated within a schedule (see slopes table 400 of FIG. 4). In an exemplary embodiment, the slopes are recalculated and saved each time that an adjustment to a fuel-flow split is made.

Upon determining that one or more parameters are out of tune, the out-of-tune parameters are scanned against a scanning order table (see scanning order table 300 of FIG. 3). Typically, the scanning order table organizes a set of parameters based on their respective criticality to the combustor operation or any other metrics that the customer has established during commissioning or thereafter during commercial operation. The out-of-tune parameters may be compared against the scanning order table to identify the first out-of-tune parameter that is encountered therein and to note those other parameters that exhibit over-limit conditions. In one instance, the first out-of-tune parameter encountered in the ordering is assigned a name (OOT1), where OOT1 is corrected for primarily with consideration of the other parameters exhibiting over-limit conditions. In one instance, primarily correcting for the first out-of-tune parameter may involve plotting curves (see FIGS. 5-7) in an overlaid fashion and selecting a fuel-flow split to increment that is associated with an optimal set of curves. The optimal set of curves is designated as such because the overlaid curves indicate that, upon incrementing the fuel-split associated therewith, the first out-of-tune parameter is likely improved while a least amount of detrimental change is imposed on the other over-limit parameters.

In operation, the parameter assigned the name OOT1 (first parameter encountered in the scanning order table) is addressed. Upon addressing the out-of-tune parameter assigned OOT1 (i.e., attempting to repair the out-of-tune parameter to an in-tune condition by adjusting a fuel-flow split a single increment), the out-of-tune parameters are again compared against the scanning order table to identify the out-of-tune parameter that should be assigned the name OOT1. In an exemplary embodiment, the out-of-tune parameters are compared against the out-of-tune table each time one of the fuel-flow splits is incremented.

When addressing the out-of-tune parameter assigned OOT1, a group of plots is generated (e.g., groups 500, 600, and 700, of FIGS. 5, 6, and 7, respectively). Generally, each plot within the group represents a different fuel-flow split and presents a plurality of slopes in a layered fashion. Each of the slopes is associated with an individual out-of-tune parameter, such that a single slope describes the interplay/relationship between one out-of-tune parameter and one fuel-flow split. Upon evaluation of the group of plots, the plot representing the fuel-flow split that, when adjusted, provides a greatest positive impact to the parameter being addressed (OOT1) and provides the least negative impact on the other out-of-tune parameters (OOT2, OOT3, and so on) is selected.

This selected fuel-flow split is then adjusted by a predefined amount, which typically correlates to a bias step carved out of the tuning margins provided by a split schedule (see graph 200 of FIG. 2). That is, the adjustment may be a change to the fuel-flow split that occurs as a single, fixed, and predetermined amount. This adjustment can either increase or decrease the selected fuel-flow split (depending type of fuel circuit being adjusted) by the predetermined amount. This process of dynamically selected and adjusting the fuel-flow splits will recursively repeat until the measured parameters indicate that the GT engine is operating within a suggested range.

Upon, implementing a single adjustment of the selected fuel-flow split, the plurality of slopes may be recalculated to reflect any change in the interplay/relationship between the fuel-low splits and the parameters being read from the combustor. This plurality of recalculated slopes may be populated to, and stored within, the schedule. As such, the recalculated slopes may be employed during subsequent analysis, such as upon detecting that one or more parameters has moved to an out-of-tune condition.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 4 is an exemplary slopes table, which is populated with slopes that represent parameters versus fuel-flow splits, in accordance with an embodiment of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things, a method, a system, or a computer-program product. Accordingly, the embodiments may take the form of a hardware embodiment, a software embodiment, or an embodiment combining software and hardware. In one instance, embodiments of the present invention take the form of the computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
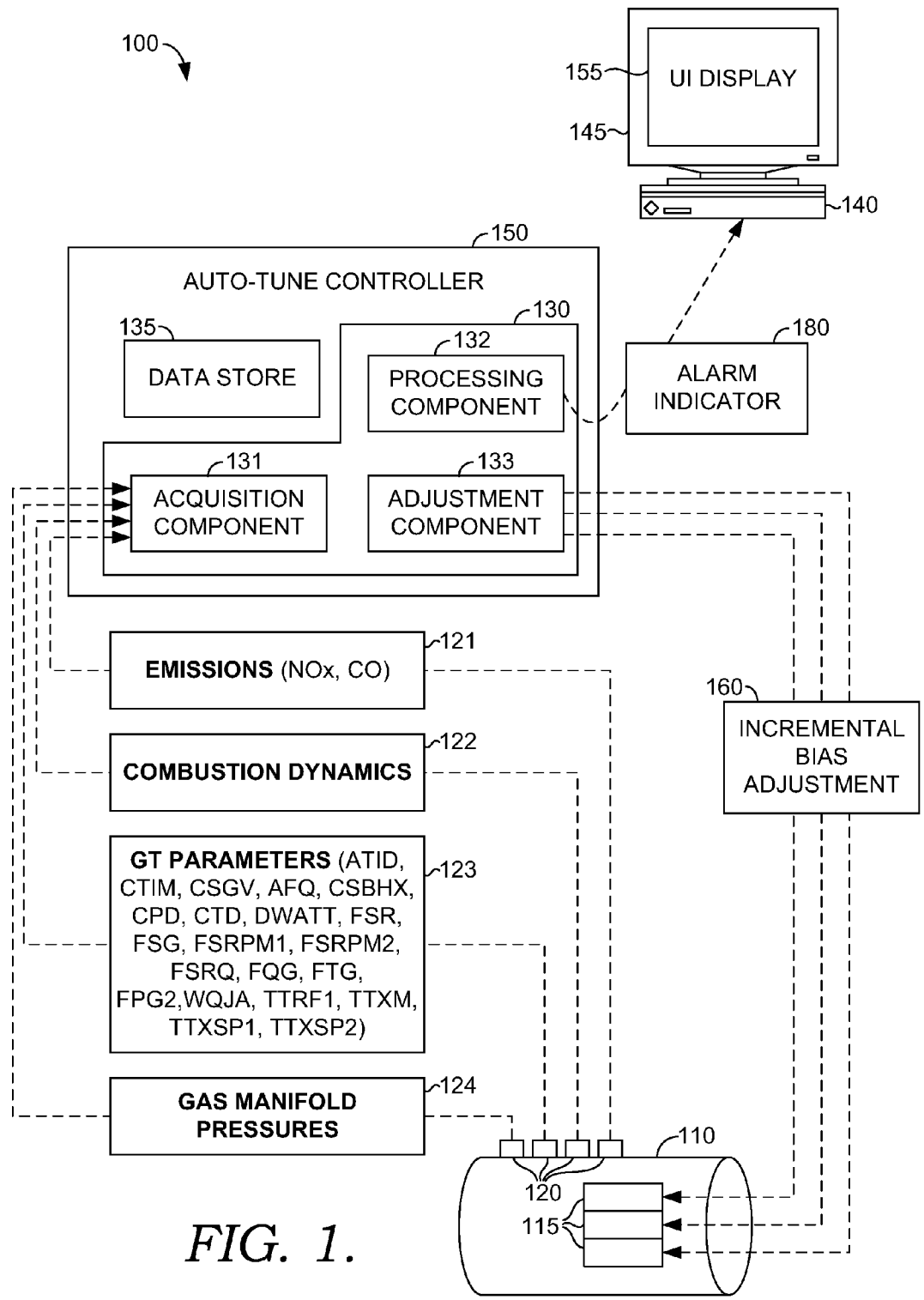
FIG. 1 is a block diagram of an exemplary tuning environment suitable for use in embodiments of the present invention.

As described above, embodiments of the present invention generally relate to automatically tuning a gas turbine engine in a dynamic fashion. With reference to FIG. 1, a gas turbine engine 110 is depicted that accommodates a plurality of combustors 115. Generally, for the purpose of discussion, the gas turbine (GT) engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustors, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby (see reference numeral 400 of FIG. 4), can be applied to any number of configurations of GT engines and that the type of GT engines describe hereinbelow should not be construed as limiting on the scope of the present invention.

As discussed above, the plurality of combustors 115 (e.g., low emission combustors) may be prone to elevated levels of pressure fluctuation within the combustor liner. These pressure fluctuations are referred to as "combustion dynamics." Left alone, combustion dynamics can have a dramatic impact on the integrity and life of the plurality of combustors 115, eventually leading to catastrophic failure.

Further, when outside an optimal operating range, the GT engine 110 may emit emissions with properties that are unacceptable (i.e., exceed a predefined threshold). In embodiments, these properties of the GT engine 110 emissions may include "emission composition," which is measure periodically by a monitoring device (e.g., continuous emission monitoring system (CEMS)). By way of example, the emission composition may be measured in units of parts per million (ppm) for each of NOx and CO, while O2 may be measured in percent (%) composition. As such, "emission compositions" relate to the amount of pollutant that is generated by the GT engine 110. Once the emission composition is measured, it is compared against a critical (maximum/minimum) value to determine whether the emission composition is actually unacceptable.

These effects of elevated combustion dynamics and/or unacceptable emission compositions may be mitigated or cured by adjusting fuel-flow splits of the combustor gas flow between several groups of nozzles within the plurality of combustors 115. Generally, a fuel-flow split is commonly adjusted for each of the plurality of combustors 115; thus, the combustors (burners) are tuned alike, as opposed to tuning at the individual burner level. These different "fuel-flow splits" are occasionally tuned to ensure that acceptable levels (conventionally low levels) of the combustion dynamics are maintained while, at the same time, promoting acceptable emission compositions.

Schedules (e.g., the slopes table 400 of FIG. 4) that govern which fuel-flow split will be adjusted for each fuel circuit are typically hard coded into a control system (not shown) of GT engine 110. In one instance, these schedules are a function of a reference that could be, amongst other things, a turbine inlet reference temperature (TTRF) or a user-defined/specific load on the GT engine 110. Over time, several parameters will affect the combustion dynamics. In particular, ambient condition changes and/or gas composition variation and/or normal wear may degrade the operation of the GT engine. This degradation leads to regular "re-tuning" of the combustor to maintain combustion dynamics and emission composition within acceptable limits.

As discussed herein, a control system for carrying out automated tuning, or the auto-tune controller 150 of FIG. 1, is used to assess the state of the GT engine 110 and the plurality of combustors 115 in terms of parameters such as the combustion dynamics, air flow, fuel-flows, emissions, and pressure distribution. Based on those parameters, the adequate fuel-flow splits are selected and are adjusted incrementally until the alarm has been cleared. Typically, the alarm is set upon detecting that an amplitude of a pressure pulse surpasses a predetermined upper or lower limit and/or upon recognizing that the composition of the combustor emissions has exceeded a particular critical value. Accordingly, embodiments of the present invention concern the auto-tune controller 150, as well as the associated tuning process, that enables automatic tuning of the combustion dynamics and emissions using small, consistent incremental changes of a dynamically selected fuel-flow split (e.g., selected by employing the schedules discussed hereinbelow).

An overall tuning process carried out by the auto-tune controller 150 may comprise one or more of the steps described immediately below. Initially, in one embodiment, various configurations of pressure signals and emissions compositions of the plurality of combustors 115 are monitored and recorded. These recorded pressure signals may be passed through a Fourier Transform or another transformative operation, where the pressure signals are converted into an amplitude versus frequency data format or spectrum. The values of the emissions compositions are also read and maintained. The amplitude, values, and frequencies are then compared against a predetermined upper or lower limit for each predefined frequency band, while the emission-composition parameters are compared against predefined critical values. The predetermined limit is generally defined in terms of pounds per square inch (psi) for a predefined frequency bands, while the critical values are defined in terms of parts per million (ppm) or percentage. However, in other instances, the predetermined limits and critical values may be expressed in other terms or units, where other types are devices are used to measure performance of the combustors 115 (e.g., accelerometers). If the determination is made that one or more of the frequency-based amplitude exceeds its respective predetermined limit(s) for a predetermined frequency band, or one or more gases comprising the emission composition surpasses its respective critical values, then the auto-tune controller 150 dynamically selects a fuel-flow split to adjust and then adjusts the selected fuel-flow split a single time at a predefined amount.

Once the single, fuel-flow split adjustment is made, the process reiterates. That is, the steps of (a) monitoring and comparing the amplitude for a number of predetermined frequency bands to the predetermined limits, (b) selecting a fuel-flow split using the schedules, and (c) making an incremental adjustment to the selected fuel-flow split are repeated if the dynamic pressure amplitude surpasses the predetermined limit(s). As such, in instances, when the dynamic pressure amplitude is ascertained to surpass the predetermined limit(s), a predetermined adjustment may be made to the previously selected fuel-flow split or a different fuel-flow split, upon employing the schedule.

Generally, one of the schedules may include the slopes table 400 of FIG. 4. The slopes table 400 may be populated with slopes of a parameter versus a fuel-flow split. For instance, the fuel-flow splits PM1 430, PM2, 440, and QUAT 450 may be indicated in the slopes table 400. These fuel-flow splits 430, 440, and 450 may have individual slopes derived therefrom, where the slopes each pertain to a specific parameter (e.g., nitrous-oxide composition of emissions in ppm (NX), carbon-dioxide composition of emissions in ppm (CO), lean blow out (LBO), cold tone (CT), hot tone (HT), and high hot tone (HHT)). Also, slopes are derived for each parameter when the turbine inlet temperature (TTRF) is measured at a value below a specific threshold (SLOPESTTRF_BREAKPOINT) 410, and when the TTRF is measured at a value above the specific threshold (SLOPESTTRF_BREAKPOINT) 420, where the specific threshold may be automatically generated or user defined. By way of example, the derived slope SLOPECOVSPM3_LO is the slope value of carbon-dioxide composition within the emissions versus the fuel-flow split PM1 when the combustor is operating at a TTRF residing below the specific threshold.

Next, upon adjusting the fuel-flow split that is selected by employing the schedule, the tuning process repeats as required until the dynamic pressure amplitude falls within the predetermined range of limits, until the emission composition resides within an acceptable range that does not exceed the critical values, or until some other criteria is triggered that indicates the fuel-flow split should not be adjusted any further. For instance, if a fuel-flow split that is selected through use of the schedule, as more fully discussed below, cannot be adjusted further, then an alarm indication is issued to an operator. These actions are distinct from a fixed-schedule scheme, where, only when adjustment of the first fuel-flow split is exhausted will the tuning process move to a second fuel-flow split.

Although a dynamic scheme for iteratively selecting a fuel-flow split for adjustment, adjusting the selected fuel-flow split a predefined increment, and repeating has been described immediately above, it should be understood and appreciated by those of ordinary skill in the art that other types of suitable schemes that select and adjust fuel-flow splits may be used, and that embodiments of the present invention are not limited to those schemes that dynamically select a fuel-flow split. For instance, one embodiment of the tuning scheme may iteratively adjust the selected fuel-flow split by a predefined increment and pause for a period of time before repeating the process of measuring the parameters from the combustor. This way, the combustor is allowed to stabilize upon the occurrence of the fuel-flow-split adjustment.

With reference to FIG. 1, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a computing device 140, and the GT engine 110. The auto-tune controller 100 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 100 is provided with the data store 135. Generally, the data store 135 is configured to store information associated with the tuning process or data generated upon monitoring the GT engine 100. In various embodiments, such information may include, without limitation, measurement data (e.g., measurements 121, 122, 123, and 124) provided by sensors 120 coupled to the GT engine 110. In addition, the data store 135 may be configured to be searchable for suitable access of stored information. For instance, the data store 135 may be searchable for dynamic schedules (e.g., slopes table 400 of FIG. 4) in order to determine which fuel-flow split to increment upon comparing the measured dynamic pressure amplitudes to corresponding predetermined limit(s) and upon comparing the measured emissions compositions to corresponding critical values, respectively. It will be understood and appreciated that the information stored in the data store 135 may be configurable and may include any information relevant to the tuning process. The content and volume of such information are not intended to limit the scope of embodiments of the present invention.

Figures 2, 3:
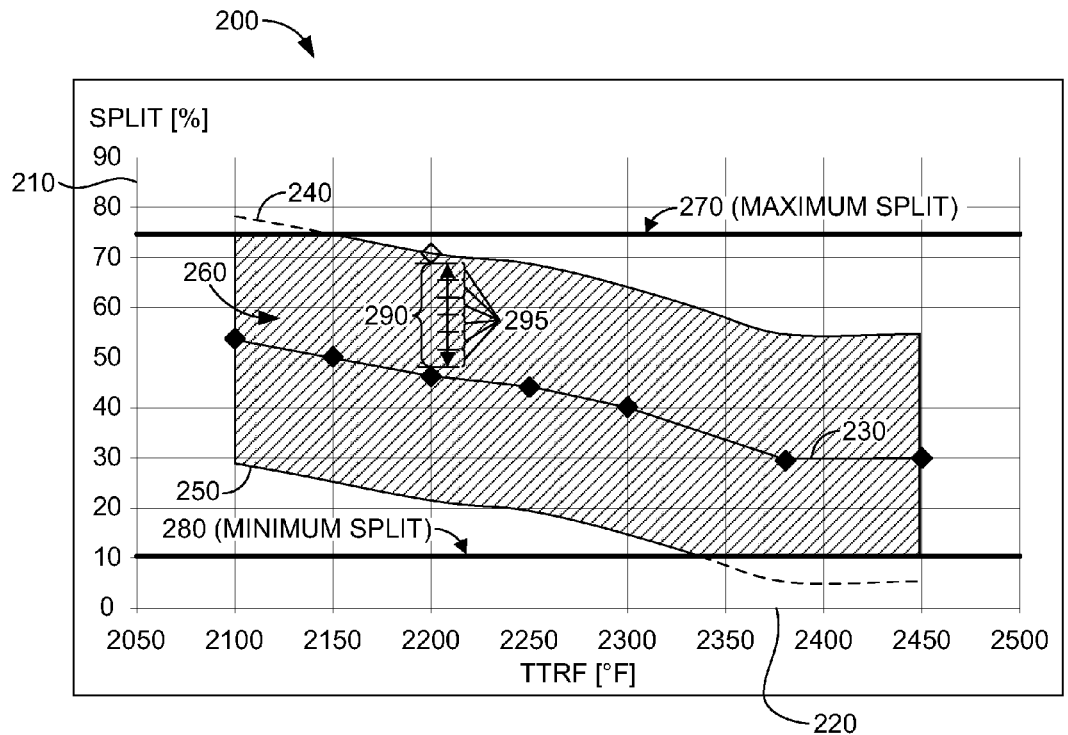
FIG. 2 is an exemplary diagram depiction of a graph that illustrates a tuning region for a particular parameter, in accordance with an embodiment of the present invention.
FIG. 3 is an exemplary chart depicting one instance of a scanning order table, in accordance with an embodiment of the present invention.

In embodiments, the auto-tune controller 100 will record look-up tables (e.g., graph 200 of FIG. 2, scanning order table 300 of FIG. 3, and the like). These look-up tables may include information related to the operational conditions of the GT engine and combustors attached thereto. By way of example, the look-up tables may relate to split-schedule limits for a particular fuel-flow split (or "knob"), as shown in graph 200 of FIG. 2. With reference to FIG. 2, the graph 200 shows an illustrative tuning region 260 (shaded area) that surrounds a base-line curve 230 for a subject fuel-flow split, where the base-line curve 230 is typically established upon commissioning the combustor. In an exemplary embodiment, the tuning region 260 is bounded by a maximum split 270 (maximum tune margin) and an upper tuning boundary 240 on the top, and by a minimum split 280 (minimum tune margin) and a lower tuning boundary 250 on the bottom. In operation, by way of example, the combination of the maximum split 270 and the upper tuning boundary 240 defines the upper boundary, which limits the amount of positive bias 290 that may added to a particular fuel-flow split. That is, the upper boundary creates an artificial limit that prevents the auto-tune controller 100 from iteratively adjusting the particular fuel-flow split beyond the acceptable positive bias 290.

Further, the positive bias 290 may be divided into steps 295 that are used to incrementally adjust the fuel-flow split upward therewithin. These steps 295 may be proportionately sized and divide the positive bias 290 evenly, or may be of varying sizes (e.g., logarithmically scaled to introduce a large increment initially, and a small increment when closing in on the top boundary). Although not depicted in FIG. 2, a negative bias that is divided into steps may be used establish an amount of negative incremental adjustment for a particular fuel-flow split.

In another instance of a look-up table recorded at the auto-tune controller 100, a list of parameters (not shown) mapped to upper and lower limits (e.g., amplitudes measuring combustor dynamics), or upper and lower critical values (e.g., composition readings measuring a quality of combustor emissions) may be stored and updated periodically. As discussed above, these measured parameters (e.g., LBO, CT, HT, HHT, NX, and CO) may represent operational properties of the combustor that can be compared against predefined limits/values to determine whether the combustor is running efficiently within an acceptable performance range. If none of the parameters are determined to surpass a corresponding set of limits/values, then the auto-tune controller 100 determines that the combustor's performance is aligned with satisfactory operational characteristics, and no fuel-flow split adjustment is deemed necessary. Yet, if one or more of the parameters, upon comparison, is measured at an amplitude/value outside its respective predefined limit/value, thus identified as "out of tune," one or more of the tuning processes described herein is automatically invoked.

When an exemplary tuning process is invoked, another look-up table stored at the auto-tune controller 100 may be accessed. An example of this look-up table is provided as scanning order table 300 in FIG. 3. Turning now to FIG. 3, the scanning order table 300 is shown. In embodiments, the scanning order table 300 illustrates a scheme for picking a parameter, of the out-of-tune parameters, to address first. If there is only one out-of-tune parameter, the scanning order table 300 is may not be accessed, because the single out-of-tune parameter will be addressed in isolation. By way of example, addressing the single out-of-tune parameter in isolation may involve comparing a set of plots (see reference numeral 500 of FIG. 5) to determine the slope representing the fuel-flow split that most significantly impacts the single out-of-tune parameter; thus, expeditiously bringing the amplitude or value of the single out-of-tune parameter within its designated compliance limits.

However, if more than one out-of-tune parameter exists, the scanning order table 300 is typically be accessed to determine which of the current out-of-tune parameters to tune first, or primarily, and which of the current out-of-tune parameters to consider but with less emphasis, as being ancillary. In embodiments, the determination of the first out-of-tune parameter is based upon an ordering of the parameters within the scanning order table. This ordering may be established based on logic that may be contemplated by a user. As depicted in FIG. 3, the scanning order table 300 is populated with the LBO parameter being placed at the top of the ordering (occupying row 310) and with the CO parameter having the being positioned at the bottom of the ordering (occupying row 360). Other parameters indicated by the scanning order table 300, sequentially organized within the ordering, include CT, HT, HHT, and NX.

The parameters in the scanning order table 300 are each assigned a name as well. For instance, upon accessing the scanning order table 300 with two out-of-tune parameters, the over-limit parameter that is encountered first when scanning the ordering of the scanning order table is designated the name OOT1 while the other over-limit parameter is designated the name OOT2. In practice, the first encountered over-limit parameter (OOT1) is tuned, while creating the least negative effect on the other over-limit parameter (OOT2).

By way of example, designating over-limit parameters comprises assigning a low name (OOT1) to the first parameter (e.g., CT of row 320) that is encountered when scanning the scanning order table 300, while assigning a name (OOT2) to the second parameter (e.g., NX of row 350) that is subsequently encountered within the scanning order table 300. In this example, the tuning processes will likely address the OOT1, as dictated by the scanning order table, by selecting an appropriate fuel-flow split that substantially impacts OOT1 in a manner that is not detrimental to the overall system (i.e., considering the existence of OOT2). The tuning process continues by adjusting the selected fuel-flow split one increment, or one bias step, as discussed above.

Once the auto-tune controller 100 has assigned each of the out-of-tune parameters a name, a group of plots is generated that each represent a particular fuel-flow split. Further, each of the plots includes a slope that is associated with each of the out-of-tune parameters, where the slopes are layered/overlaid/overlapped on top of each other. By overlaying the slopes on top of each other, each plot depicts a robust comparison of the interplay between adjustment of a specific fuel-flow split and resultant adjustment of each of the plotted out-of-tune parameters. Accordingly, the group of plots allow the auto-tune controller 100 to select a fuel-flow split that, when adjusted, provides a greatest positive impact to the first out-of tune parameter and provides a least negative impact on other out-of-tune parameters. Next, the selected fuel-flow split is automatically adjusted by a single predefined amount, where the predefined amount is determined from the tune-margin steps within the split schedule (e.g., see graph 200 of FIG. 2).

Figure 5:
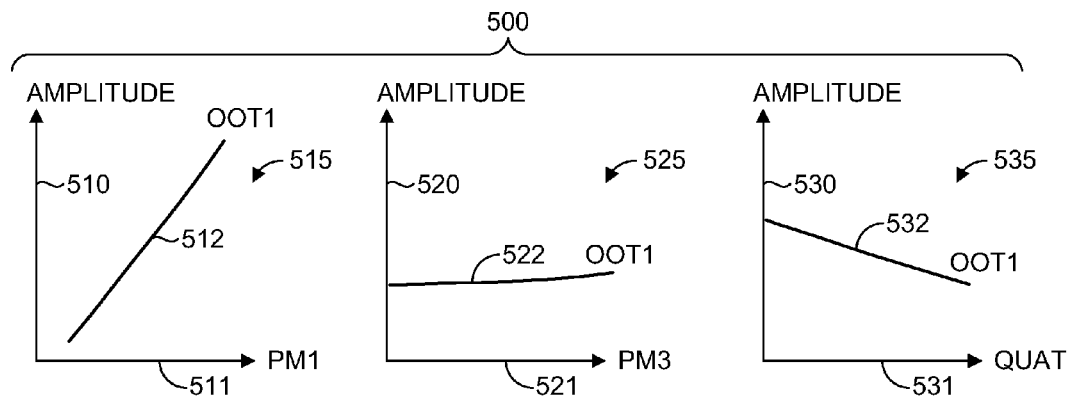
FIGS. 5-7 depict a groups of plots, which expose slopes or overlapping slopes, that each represent a parameter graphed against a fuel-flow split, in accordance with embodiments of the present invention.
Figure 6:
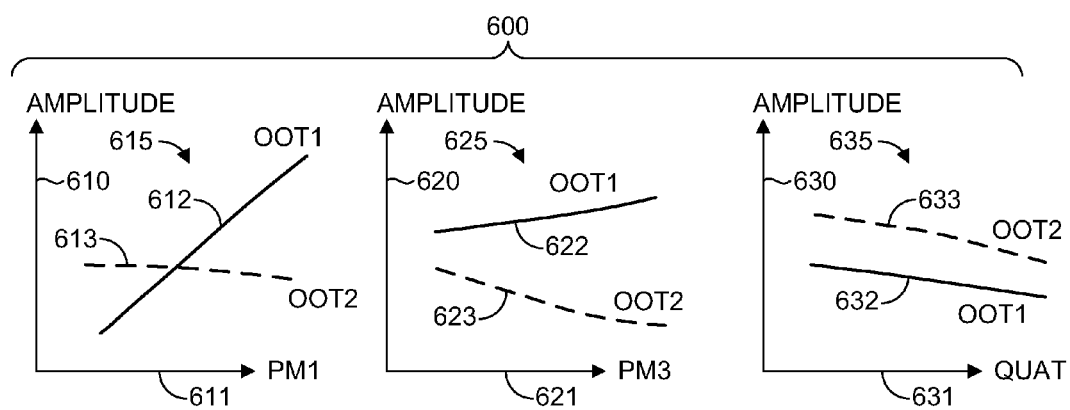
Figure 7:
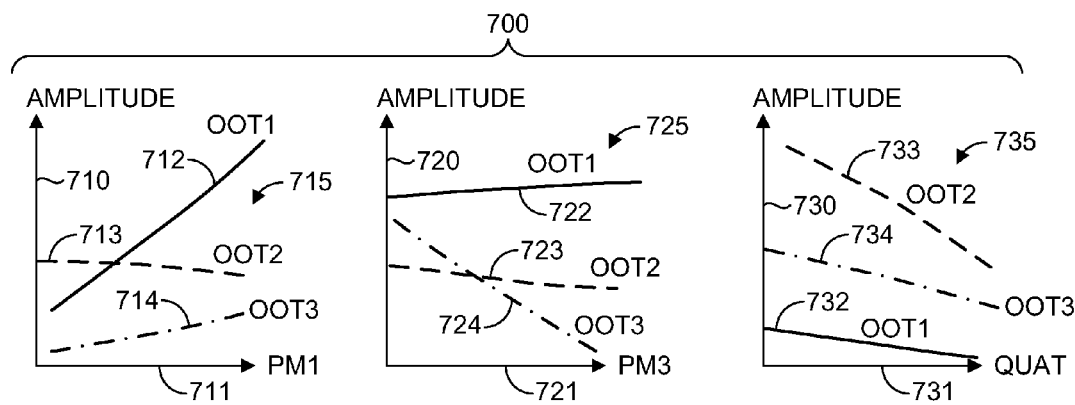

Turning now to FIGS. 5-7, three groups of plots 500, 600, and 700 are illustrated, in accordance with embodiments of the present invention. Referring first to FIG. 5, the group of plots includes plots 515, 525, and 535 that represent the fuel-flow splits PM1, PM3, and QUAT respectively. Further, each of the plots 515, 525, and 535 includes the single slopes 512, 522, and 532, respectively. Each of the single slopes 512, 522, and 532 are directed toward an out-of-tune parameter (OOT1) whose amplitude is depicted on the y-axis 510, 520, and 530 of the plots 515, 525, and 535, respectively. The values of the fuel-flow splits PM1, PM3, and QUAT are depicted on the x-axis 511, 521, and 531 of the plots 515, 525, and 535, respectively.

In operation, the plots 515, 525, and 535 are used to pick the fuel-flow split that will most quickly bring in-tune the out-of-tune parameter. In the example illustrated in FIG. 5, OOT1 is being addressed in isolation (i.e., no other out-of-tune parameters are detected). Further, assuming the OOT1 represents a parameter that is measured at an amplitude exceeding a predetermine limit, the slope that will most expeditiously decrease the amplitude of OOT1 will point to the optimum fuel-flow split. As shown, the slope 512 has the greatest slope value and, thus, will provide the most impact on the OOT1 when the corresponding fuel-flow split (PM1) is adjusted. Accordingly, the group of plots 500 indentifies PM1 as the proper fuel-flow split to select for adjustment given the exemplary case above.

When addressing the single out-of-tune parameter in isolation, the analysis is straight forward as each slope may be separately compared across the set of plots (see reference numeral 500 of FIG. 5) to determine the fuel-flow split that most significantly impacts the out-of-tune parameter. As discussed above, the comparison involves evaluating the incline of the slopes against each other to find the steepest slope. However, the analysis becomes more complex when there are various slopes overlaid on top of each other within a single plot.

Referring now to FIG. 6, the group of plots 600 includes plots 615, 625, and 635 that represent the fuel-flow splits PM1, PM3, and QUAT respectively. Further, each of the plots 615, 625, and 635 includes the slopes 612, 622, and 632, respectively, and the slopes 613, 623, and 633, respectively. Each of the slopes 612, 622, and 632 are directed toward the first-encountered, out-of-tune parameter (OOT1) upon scanning the scanning order table, whose amplitude is depicted on the y-axis 610, 620, and 630 of the plots 615, 625, and 635, respectively. And, each of the slopes 613, 623, and 633 are directed toward the second-encountered, out-of-tune parameter (OOT2), whose amplitude is also depicted on the y-axes 610, 620, and 630. As shown, the slopes 613, 623, and 633 of OOT2 versus the fuel-flow splits PM1, PM3, and QUAT are overlaid on top of the slopes 612, 622, and 632 of OOT1 versus the fuel-flow splits PM1, PM3, and QUAT. During analysis, the slopes 612, 622, and 632 of OOT1 are initially reviewed to bring OOT1 into compliance, while the slopes 613, 623, and 633 of OOT2 are considered to ensure that OOT2 is not adversely impacted upon adjusting a particular fuel-flow split.

By way of example, with continued reference to FIG. 6, analysis of plot 615 shows that the trend of slope 612 has the most impact on OOT1 (e.g., steepest slope), but the trend of slope 613 has a substantial negative impact on OOT2, as slope 613 is opposite in direction to slope 612. However, analysis of plot 635 shows that both slopes 632 and 633 are trending in the same direction. In plot 635, the trend of the slope 632, which positively affects the out-of-tune parameter being currently addressed, does not provide as great an impact on OOT1 as the trend of slope 612 of graph 615, the trends in both graphs 615 and 635 are considered in aggregate, not in isolation. That is, when slope 632 is evaluated in conjunction with slope 633, the combined impact on OOT1 and OOT2 is of greater positive impact than the aggregation of slopes 612 and 613 of plot 615. As such, the QUAT fuel-flow split (represented by graph 635) is likely to be selected from the group of plots 600 based on QUAT's ability to produce the greatest positive impact on the combination of the out-of-tune parameters when adjusted by a predefined amount.

It should be noted that the sign of the step change, or predefined amount of adjustment, of the selected fuel-flow split can be distilled from the plot representing the fuel-flow split. For instance, with reference to FIG. 5, in order to reduce the amplitude of OOT1, the slope 512 indicates that fuel-flow split PM1 is also reduced. That is, the sign of the step change, in this case, is the inverse of the average value of the slope 512. In another instance, with reference to FIG. 6, in order to reduce the amplitude of OOT1 and of OOT2, the slopes 632 and 633 indicate that fuel-flow split QUAT should be increased. That is, the sign of the step change used to adjust QUAT one increment is inverse to the average value of each of the slopes 632, and 633.

Referring now to FIG. 7, the group of plots 700 includes plots 715, 725, and 735 that represent the fuel-flow splits PM1, PM3, and QUAT respectively. Further, plot 715, which represents fuel-flow split PM1, includes the slopes 712, 713, and 714 that are associated with OOT1, OOT2, and OOT3, respectively. As such, in the embodiment illustrated in FIG. 7, there are three parameters that are concurrently out-of-tune. Fuel-flow split PM3 is represented by plot 725 that includes slopes 722, 723, and 724, while fuel-flow split QUAT is represented by plot 735 that includes slopes 732, 733, and 734. In an exemplary embodiment, the values that support the slopes described above can be extracted from the slopes table 400 of FIG. 4. For instance, when the TTRF is below the user-defined breakpoint and the out-of-tune parameters comprise NX (OOT1), LBO (OOT2), and CT (OOT3), the values used derive the slopes 732, 733, and 734 are SLOPENXVSQUAT_LO, SLOPELBOVSQUAT_LO, and SLOPECTVSQUAT_LO, respectively.

Each of the slopes 712, 722, and 732 are directed toward the first-encountered, out-of-tune parameter (OOT1) upon scanning the scanning order table, whose amplitude is depicted on the y-axis 710, 720, and 730 of the plots 715, 725, and 735, respectively. Further, each of the slopes 713, 723, and 733 is directed toward the second-encountered, out-of-tune parameter (OOT2), and each of the slopes 714, 724, and 734 is directed toward the third-encountered, out-of-tune parameter (OOT3). As shown, the slopes 713, 723, and 733 associated with OOT2 and the slopes 714, 724, and 734 associated with OOT3 are overlaid on top of the slopes 712, 722, and 732 of OOT1 for each of the plots 715, 725, and 735 for the fuel-flow splits PM1, PM3, and QUAT, respectively. During analysis, the slopes 712, 722, and 732 of OOT1 are initially reviewed to bring OOT1 into compliance, while the slopes 713, 723, and 733 of OOT2, as well as the slopes 714, 724, and 734 of OOT3, are considered to ensure that OOT2 and OOT3 is not adversely impacted upon adjusting a particular fuel-flow split, even if that adjustment positively impacts OOT1 in a significant way.

By way of example, with continued reference to FIG. 7, analysis of plot 715 shows that the trend of slope 712 has the most impact on OOT1 (e.g., steepest slope), but the trend of slope 713 has a substantial negative impact on OOT2, as slope 713 is opposite in direction to slope 712. That is, adjustment of the fuel-flow split PM1 represented by plot 715 would generate the most decrease in amplitude of OOT1, but inherently produces a negative, undesired impact on OOT2. Because, in this embodiment, the combined impact of adjusting a fuel-flow split on the out-of-tune parameters is of greatest importance, the sensitivity of each of the out-of-tune parameters considered when selecting the appropriate fuel-flow split. As such, plot 715 indicates that adjusting PM1 to improve OOT1 causes a negative impact on OOT2, thus, implicitly indicates that PM1 is not likely the optimal fuel-flow split to select.

However, analysis of plot 735 shows that slopes 732 (OOT1), 733 (OOT2), and 734 (OOT3) are trending in the same direction. In plot 735, the trend of the slope 732, which positively affects the out-of-tune parameter being currently addressed, does not provide as great an impact on OOT1 as the trend of slope 712 of graph 715. Yet, the trends in both graphs 715 and 735 are considered in aggregate, not in isolation. That is, when slope 732 is evaluated in conjunction with slope 733 and 734, the combined impact on OOT1, OOT2, and OOT3 is of greater positive impact than the aggregation of slopes 712, 713, and 714 of plot 715. As such, the QUAT fuel-flow split (represented by graph 735) is likely to be selected from the group of plots 700 based on QUAT's ability to produce the greatest positive impact on the combination of the out-of-tune parameters when adjusted by a predefined amount.

Although a single scheme for selecting a fuel-flow split has been described, it should be understood and appreciated by those of ordinary skill in the art that other types of suitable schemes that provide for consideration of out-of-tune parameters beyond the out-of-tune parameter being address may be used, and that embodiments of the present invention are not limited to the comparison of plots with overlapping slopes being considered concurrently, as described herein. In addition, it should be noted that the auto-tune controller can be used with a variety of combustion systems. Therefore, the present invention is not limited to just three fuel-flow split adjustments (PM1, PM3, and QUAT), that are described herein. The exact quantity of fuel nozzles and fuel-flow splits can vary depending on the combustor configuration and type of GT engine being tuned. So, for a different combustion system, the number of fuel-flow splits, and the number of bias steps per tune margin within each, could be greater or fewer than those depicted in the present disclosure without departing from the essence of the present invention.

Returning to FIG. 1, the exemplary tuning environment 100 includes the computing device 140, which is operably coupled to a presentation device 145 for displaying a user interface (UI) display 155 that warns an operator of a status of tuning, or a failure to automatically tune the GT engine 100. The computing device 140, shown in FIG. 1, may take the form of various types of computing devices. By way of example only and not limitation, the computing device 145 may be a personal computer, desktop computer, laptop computer, handheld device, consumer electronic device (e.g., pager), handheld device (e.g., personal digital assistant), various servers, and the like. It should be noted, however, that the invention is not limited to implementation on such computing devices, but may be implemented on any of a variety of different types of computing devices within the scope of embodiments of the present invention.

Figure 8:
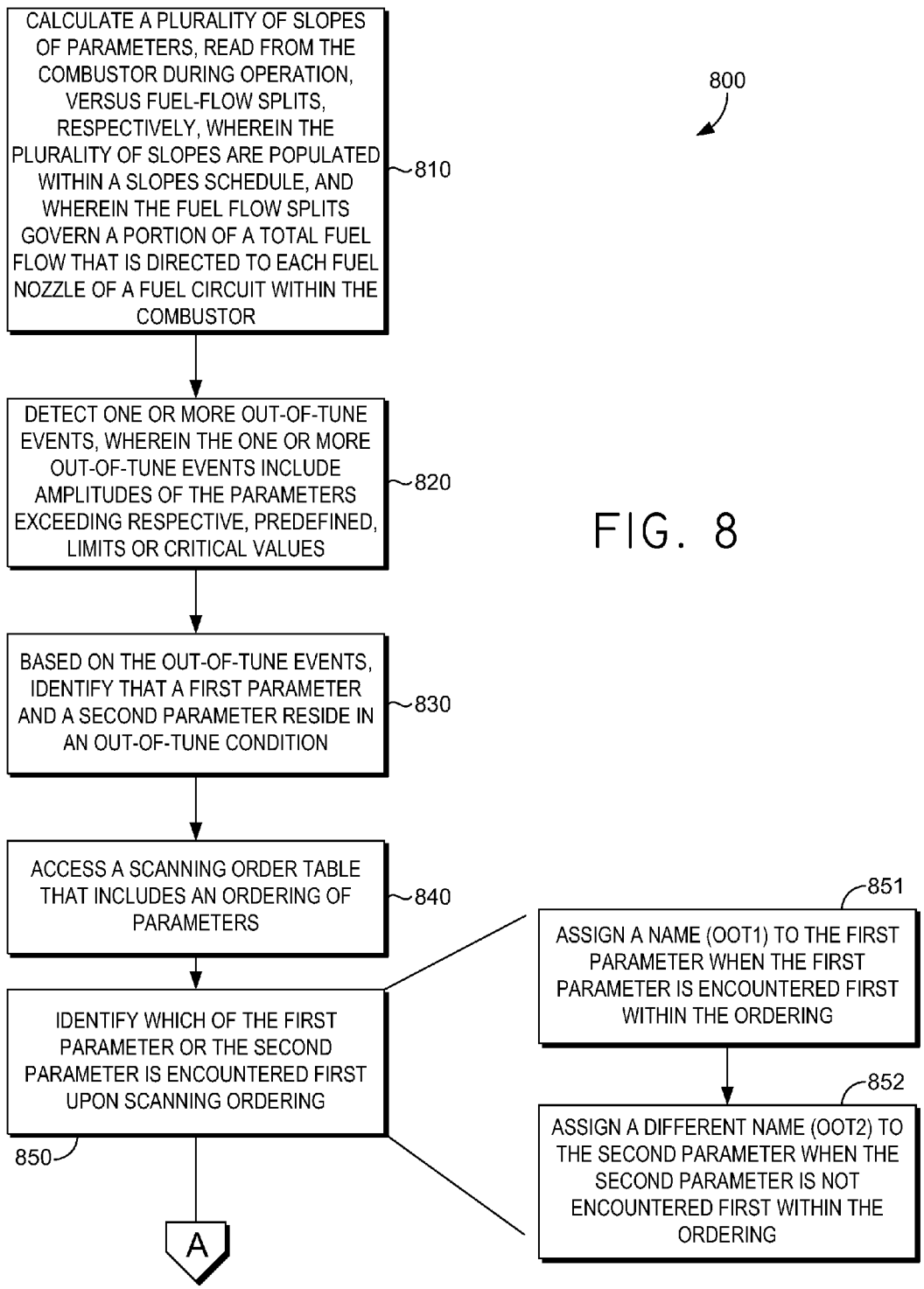
FIG. 8 is a flow diagram of an overall method for employing an auto-tune controller to implement a dynamic tuning process that includes measuring parameters from a combustor and altering the fuel-flow splits based on the parameters that are out of tune, in accordance with an embodiment of the present invention.
Figure 8:
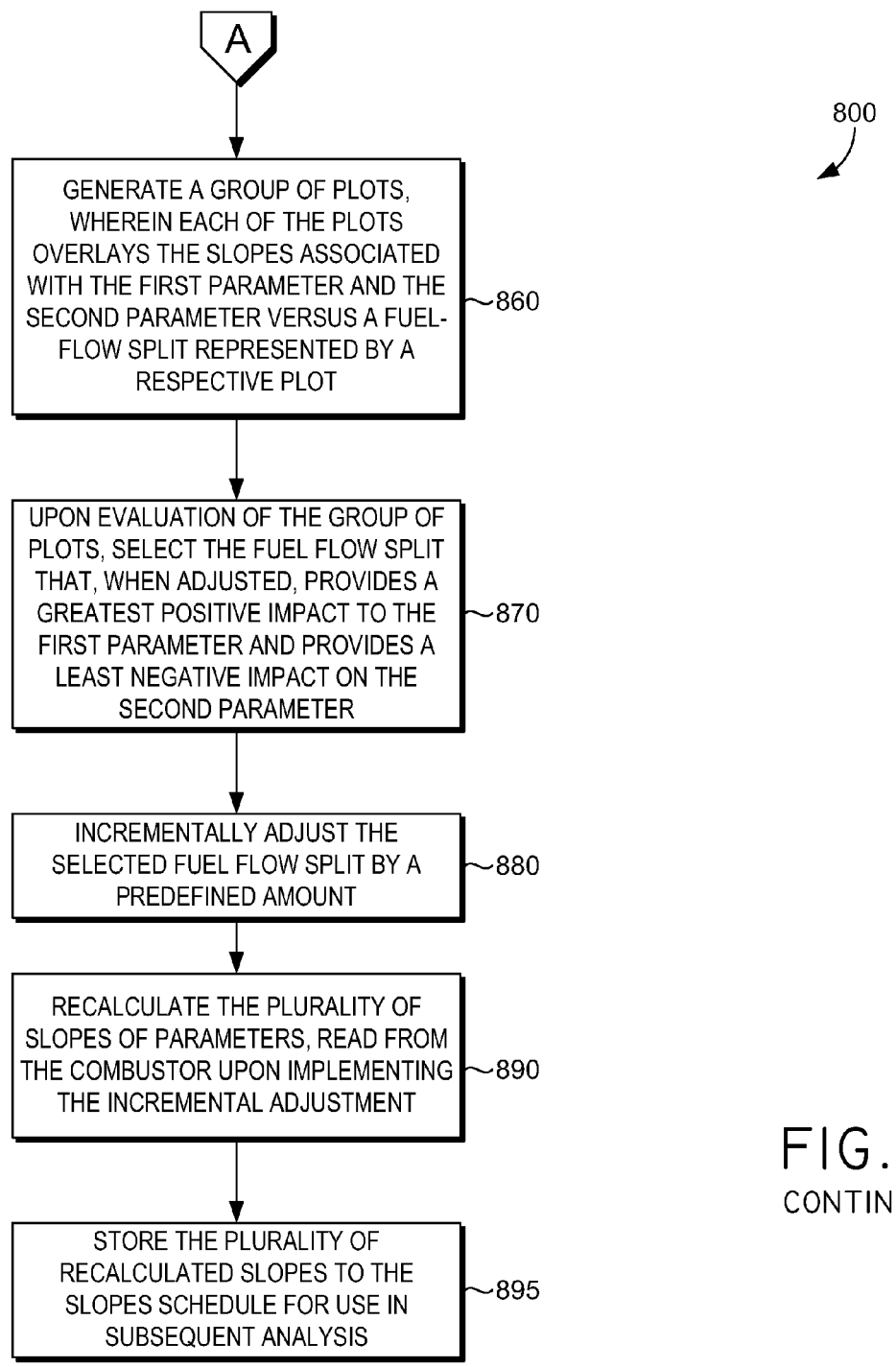

With reference to FIG. 8, an exemplary, dynamic tuning process will now be discussed in light of the exemplary tuning environment 100 of FIG. 1. Generally, FIG. 8 is a flow diagram of an overall method 800 for employing the auto-tune controller 150 of FIG. 1 to implement the exemplary, dynamic tuning process that includes collecting measurements from the plurality of combustors 115 and altering the fuel-flow splits based on the parameters that are out of tune, in accordance with an embodiment of the present invention.

Initially, the overall method 800 includes monitoring data that represents combustion dynamics of the GT engine 100. In one embodiment, the combustion dynamics 122 are measured for each of the plurality of combustors 115 using the sensors 120 (e.g., pressure transducers) that communicate the measurement data to the acquisition component 131. In another embodiment, the sensors 120 communicate composition of the emissions 121 that are detected from the GT engine 100. In yet other embodiments, the measurement data collected from the GT engine 110 may include, but is not limited to, GT parameters 123 and gas manifold pressures 124. In some instances, the data collected from the GT engine 100 is normalized. For instance, the sensors 120 may be configured as pressure transducers that detect pressure fluctuations in each of the plurality of combustors 115 and report those fluctuations as the combustion dynamics 122. The fluctuations may be measured over a time period and sent to the acquisition component 131 in the form of a rolling average of pressure variability or as data points that reflect a percentage or ppm of composition of a particular gas.

As indicated at block 810, a plurality of slopes of parameters (NX, CO, LBO, CT, HT, HHT, and the like) versus fuel-flow splits (PM1, PM3, QUAT, and the like) are calculated. In embodiments, various slopes are created for each parameter versus each of the splits (e.g., one slope for low load and one slope for high load). The plurality of slopes are populated within a schedule (e.g., utilizing the slopes table 400 of FIG. 4) and stored until replaced by updated slopes. In one instance, the slopes are updated on-the-fly after every incremental adjustment. A rationale for updating at this rate comes from the reality that in one particular region of the engine operation, the change to a first split is more effective than a change to the others, while in a different region, changes to another split may be more effective. In operation, the slopes may help determine the fuel-flow split to adjust, the amount of the fuel-flow split adjust in a certain increment, and the direction (up or down) to make the adjustment. As such, the parameter associated with the highest slope, with respect to the fuel-flow split selected for adjustment, will likely withstand the biggest impact when the selected fuel-flow split is adjusted.

The overall method 800 includes monitoring the combustion dynamics and emission composition of the combustor over a plurality of conditions. Specifically, pressure signals that communicate a state of the combustion dynamics may be captured during monitoring. An algorithm may be applied to the captured pressure signals, while the emission composition is read as a percentage or parts per million. In one instance, applying the algorithm involves performing a Fourier Transform on the pressure signals to convert the pressure signals into an amplitude. The amplitude of is compared to predetermined limits for different known conditions, while the composition of the emission is compared to respective critical values for particular gasses (e.g., oxygen, carbon dioxide, and nitrous oxide). If it is determined that the amplitude exceeds its respective predetermined limit, or the emission composition surpasses the critical values, an out-of-tune event is identified, as indicated at block 820. Based on a frequency of the out-of-tune events (e.g., 3 events per every 5 measurements), parameters may be identified as residing in an out-of-tune condition, as indicated at block 830.

As indicated at block 840, those parameters that are identified as residing in the out-of-tune condition are examined against a scanning order table. In embodiments, the scanning order table includes an ordering of parameters that are organized by an operator using their preferred logic. When compared to the scanning order table, the first out-of-tune parameters encountered within the ordering is designated as OOT1 and is addressed primarily when tuning. Other out-of-tune parameters are concurrently considered when tuning the first out-of-tune parameter, but with ancillary emphasis. This promotes resolving for several out-of-tune parameters at the same time, as opposed to resolving for one out-of-tune parameter at a time in isolation.

Upon scanning the scanning order table, an out-of-tune parameter is first encountered within the ordering in the scanning order table, as indicated at block 850. In aspects of the invention, a name (e.g., OOT1) may be assigned to an out-of tune parameter that is encountered first (see block 851), while a different name (e.g., OOT2, OOT3, and the like) may be assigned to an out-of tune parameter that is not encountered first (see block 852). In operation, OOT1 is primarily addressed when dynamically tuning. That is, greater emphasis is placed on OOT1 when considering the group of out-of-tune parameters as an aggregate.

According to some embodiments, the model described herein is always placing emphasis on the first-encountered parameter (OOT1) during tuning. Once a fuel-flow split is adjusted to address OOT1, the overall method 800 repeats and scans through scanning order table with the out-of-tune parameters that exist in an over-limit condition to find the presently out-of-tune parameter that is encountered first in the scanning order table and names this parameter OOT1.

Next, the process of selecting and adjusting the appropriate fuel-flow split is invoked. Unlike other systems in which a single fuel-flow split is continuously adjusted until the combustion dynamics and/or the emission composition is brought within compliance of tuning limits and/or critical values, the fuel-flow split is dynamically reselected upon implementing each adjustment. In order to facilitate this model, plots of layered slopes are dynamically recomposed and evaluated subsequent to every adjustment. As indicated at block 860, a group of plots is generated (e.g., groups 500, 600, and 700, of FIGS. 5, 6, and 7, respectively). Generally, each plot within the group represents a difference fuel-flow split and presents a plurality of slopes in an overlaid fashion. Each of the slopes is associated with an individual out-of-tune parameter, such that a single slope describes the interplay/relationship between one out-of-tune parameter and one fuel-flow split. Upon evaluation of the group of plots, as indicated at block 870, the plot representing the fuel-flow split that, when adjusted, provides a greatest positive impact to the parameter being addressed and provides the least negative impact on the other out-of-tune parameters is selected.

In one instance when there are two out-of-tune parameters (OOT1 and OOT2), the model considers the pair of slopes concurrently with respect to each of the fuel-flow splits individually. This combined consideration overcomes the problem of entering a loop by considering just one slope at a time (e.g., adjust one way, then adjust another way, and then repeat). In operation, the fuel-flow split that has the greatest positive impact on OOT1 to address the highest priority parameter, while having the least negative impact on OOT2, is selected. This model is implemented in order to maximize efficiency of tuning OOT1, while minimizing degradation of OOT2. As such, focus is placed on OOT1, but it is not tuned in isolation of the other out-of-tune parameters (i.e., attempt to prevent negatively impacting the other parameters that are out-of-tune).

As indicated at block 880, the selected fuel-flow split is adjusted by a predefined amount, which correlates to a bias step within the tuning margins of a split schedule (see graph 200 of FIG. 2). In one instance, the adjustment is a change in the fuel-flow split carried out as a single, fixed, and predetermined amount. This adjustment can either increase or decrease the selected fuel-flow split (depending type of fuel circuit being adjusted). Incrementally adjusting the fuel-flow split may be accomplished by the adjustment component 133 of FIG. 1 transmitting an incremental bias adjustment 160 to at least one of the plurality of combustors 115 mounted to the GT engine 100. In one embodiment, automatic valves on the combustors 115 adjust the fuel-flow split for a subject fuel circuit in response to recognizing the incoming incremental bias adjustment 160.

This predefined amount is typically based on testing experience and the combustor identity. In one instance, the predefined amount of incremental adjustment is 0.25% adjustment of the fuel-flow split between the injection ports. Accordingly, by incrementing a fuel-flow split upwards or downwards by the predefined amount, the pattern of fuel-flow distribution through injection points is altered. However, even though the fuel-flow split is changed, the total fuel-flow to the fuel circuit is generally held constant.

Upon applying the incremental bias adjustment 160, the auto-tune controller 150 waits a period of time, or pauses, before acquiring and processing data extracted from the GT engine 100. Waiting the period of time ensures that the GT engine 100 stabilizes before checking to determine whether adjusting the fuel-flow split was sufficient to tune the GT engine 100. In embodiments, the period of time that is waited between adjustments may vary based on the type of out-of tune parameter being addressed with the fuel-flow split adjustment. For instance, the period of time required to stabilize a combustion dynamic may be less that the period of time required to stabilize emission composition.

Also, upon applying the incremental bias adjustment 160, the auto-tune controller 150 waits for the GT engine to stabilize and then recalculates the plurality of slopes associated with the measured parameters, as indicated at block 890. This recalculation encapsulates a "dynamic" aspect of the overall method 800 by adjusting the slopes to correspond with the present operating curve of the combustor. These recalculated slopes may be stored in a schedule (e.g., slopes table 400 of FIG. 4) for future access and analysis purposes, as depicted at block 895.

Figure 9:
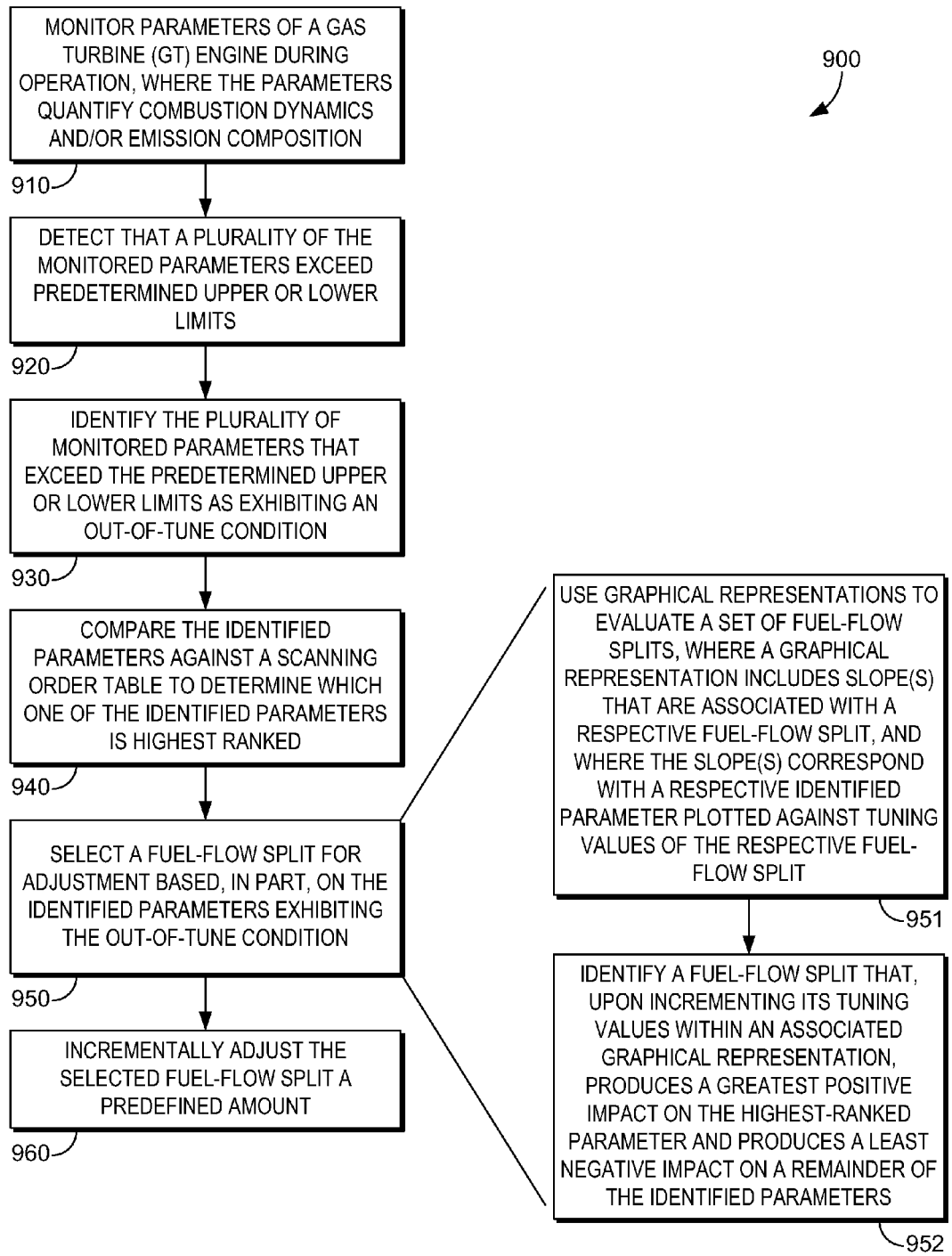
FIG. 9 is a flow diagram of an overall method for dynamically tuning a combustor of a gas turbine (GT) engine, in accordance with an embodiment of the present invention.

Turning now to FIG. 9, a flow diagram is shown of an overall method 900 for dynamically tuning a combustor of a gas turbine (GT) engine, in accordance with an embodiment of the present invention. The method 900 initially involves at least one computing device configured to monitor parameters of a GT engine during operation, as indicated at block 910. Typically, the parameters quantify combustion dynamics and/or emission composition of the GT engine. Also, the computing device(s) detect that a plurality of the monitored parameters exceed predetermined upper or lower limits, as indicated at block 920. Upon detecting the parameters have exceeded predefined limits, as indicated at block 930, the plurality of monitored parameters that exceed the predetermined upper or lower limits are identified as exhibiting an out-of-tune condition.

The method 900 may further involve comparing the identified parameters against a scanning order table to determine which one of the identified parameters is highest ranked, as indicated at block 940. Incident to comparison, as indicated at block 950, a fuel-flow split is selected for adjustment based, in part, on at least one of the identified parameters exhibiting the out-of-tune condition. In embodiments, selecting the fuel-flow split involves one or more of the following steps: using graphical representations to evaluate a set of fuel-flow splits, where a graphical representation includes slope(s) that are associated with a respective fuel-flow split (see block 951); and identifying a fuel-flow split that, upon incrementing its tuning values within an associated graphical representation, produces a greatest positive impact on the highest-ranked parameter and produces a least negative impact on a remainder of the identified parameters (see block 952). Upon selecting a fuel-flow split for implementing an adjustment thereto, the method 900 involves incrementally adjusting the selected fuel-flow split a predefined amount, as indicated at block 960.

Figure 10:
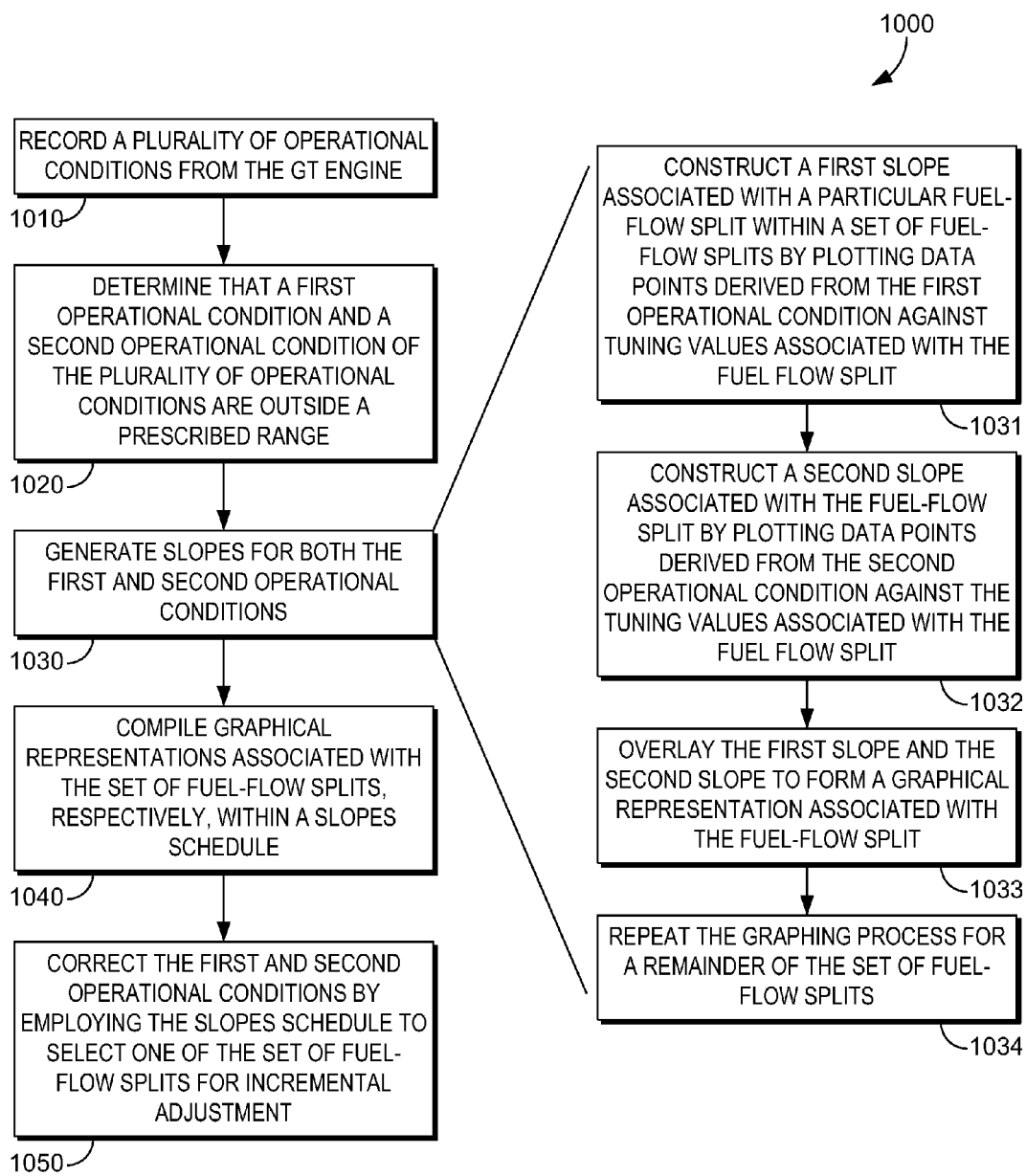
FIG. 10 is a flow diagram of an overall method for generating one or more slopes used to dynamically tune a combustor of a GT engine, in accordance with an embodiment of the present invention.

With reference to FIG. 10, a flow diagram is shown of an overall method 1000 for generating one or more slopes used to dynamically tune a combustor of a GT engine, in accordance with an embodiment of the present invention. As illustrated, the method 1000 involves recording a plurality of operational conditions from the GT engine, as indicated at block 1010. The method 1000 may then include determining that a first operational condition and a second operational condition of the plurality of operational conditions are outside a prescribed range, as indicated at block 1020. As indicated at block 1030, upon making this determination, slopes for both the first and second operational conditions are generated using the following exemplary process: constructing a first slope associated with a particular fuel-flow split within a set of fuel-flow splits by plotting data points derived from the first operational condition against tuning values associated with the fuel flow split (see block 1031); constructing a second slope associated with the fuel-flow split by plotting data points derived from the second operational condition against the tuning values associated with the fuel flow split (see block 1032); overlaying the first slope and the second slope to form a graphical representation associated with the fuel-flow split (see block 1033); and repeating the graphing process for a remainder of the set of fuel-flow splits (see block 1034). As indicated at block 1040, the method 1000 may then involve compiling graphical representations associated with the set of fuel-flow splits, respectively, within a slopes schedule. As indicated at block 1050, the first and second operational conditions are corrected by employing the slopes schedule to select one of the set of fuel-flow splits for incremental adjustment.

Figure 11:
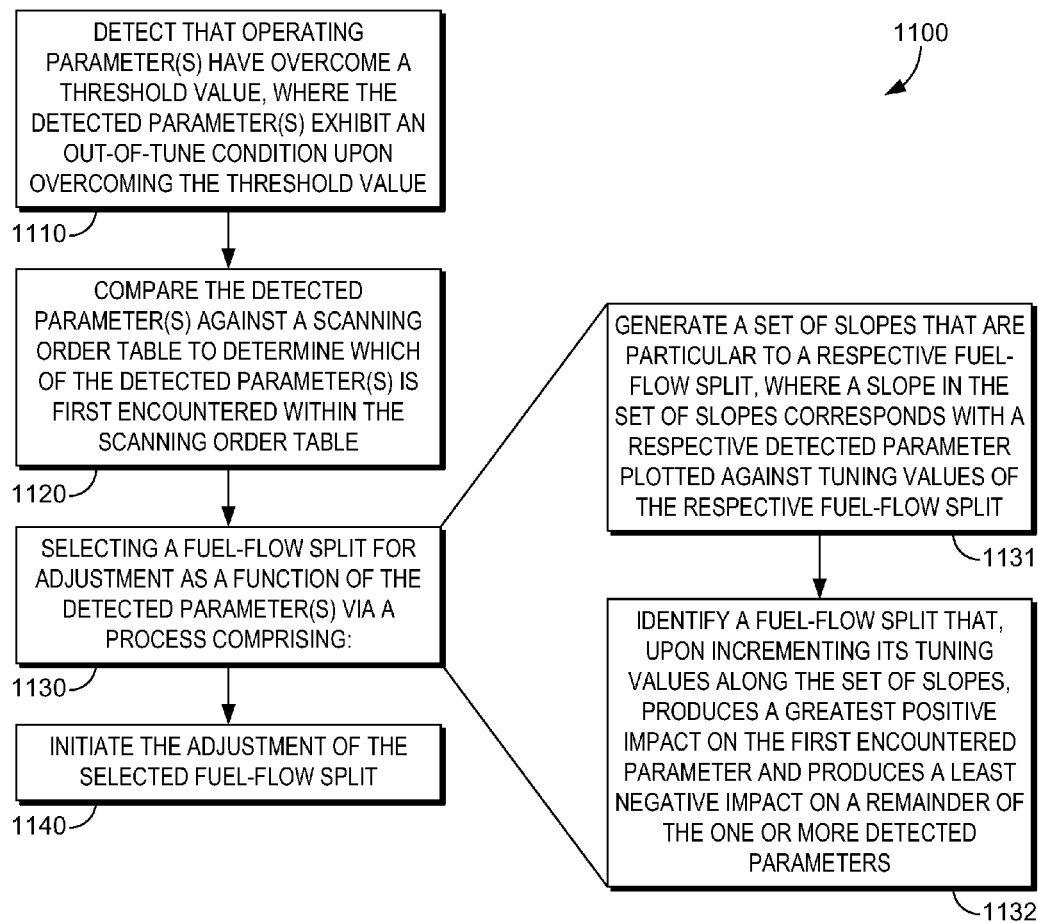
FIG. 11 is a flow diagram of an overall method for dynamically auto-tuning a GT engine, in accordance with an embodiment of the present invention.

Referring now to FIG. 11, a flow diagram of an overall method 1100 dynamically auto-tuning a GT engine is shown, in accordance with an embodiment of the present invention. The method 1100 may involve a mechanism for detecting that operating parameter(s) have overcome a threshold value, as indicated at block 1110. As discussed more fully above, the detected parameter(s) exhibit an out-of-tune condition upon overcoming the threshold value. Upon detection, the detected parameter(s) are compared against a scanning order table to determine which of the detected parameter(s) is first encountered within the scanning order table, as indicated at block 1120. Then, a fuel-flow split may be selected for adjustment as a function of the detected parameter(s). The process of selection may encompass at least one of the following steps: generating a set of slopes that are particular to a respective fuel-flow split, where a slope in the set of slopes corresponds with a respective detected parameter plotted against tuning values of the respective fuel-flow split (see block 1131); and identifying a fuel-flow split that, upon incrementing its tuning values along the set of slopes, produces a greatest positive impact on the first encountered parameter and produces a least negative impact on a remainder of the one or more detected parameters (see block 1132). The method 1100 may further perform the step of initiating one or various adjustment(s) of the selected fuel-flow split.

Various benefits arising from automatic tuning can be realized when automatic tuning is compared against the current tuning processes. That is, because the dynamic tuning process, employed in embodiments of the present invention, can be implemented automatically, many disadvantages of manually tuning are overcome. For instance, automatically executing a dynamic tune can be performed quickly, frequently, and accurately, which will substantially prevent degradation that would have occurred when using a slower and more deliberate manual tuning process. This frequent tuning reduces excess pollutants/promotes lower emissions while improving engine life.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A computerized method, implemented by a processing unit, for dynamically tuning a combustor of a gas turbine (GT) engine, the method comprising:
   monitoring parameters of the GT engine during operation, wherein the parameters quantify at least one of combustion dynamics or emission composition;
   detecting that a plurality of the monitored parameters exceed predetermined upper or lower limits;
   identifying the plurality of monitored parameters that exceed the predetermined upper or lower limits as exhibiting an out-of-tune condition;
   comparing the identified parameters against a scanning order table to determine which one of the identified parameters is highest ranked;
   selecting a fuel-flow split for adjustment based, in part, on at least one of the identified parameters exhibiting the out-of-tune condition, wherein the process of selecting comprises:
   (a) using graphical representations to evaluate a set of fuel-flow splits, wherein a graphical representation includes one or more slopes associated with a respective fuel-flow split, and wherein the one or more slopes correspond with a respective identified parameter plotted against tuning values of the respective fuel-flow split; and
   (b) identifying a fuel-flow split that, upon incrementing its tuning values within an associated graphical representation, produces a greatest positive impact on the highest-ranked parameter and produces a least negative impact on a remainder of the identified parameters; and
   incrementally adjusting the selected fuel-flow split a predefined amount.

2. The method of claim 1, wherein monitoring parameters of the GT engine comprises:
   measuring the parameters of the GT engine as pressure signals; and
   employing a transformative operation to convert the measured parameters into an amplitude versus frequency plot.

3. The method of claim 2, wherein detecting that a plurality of the monitored parameters exceed predetermined upper or lower limits comprises:
   comparing a maximum amplitude of the pressure signals against a critical value associated with at least one combustor mode; and
   detecting the maximum amplitude exceeds the critical value.

4. The method of claim 2, wherein employing a transformative operation to convert the measured parameters into an amplitude versus frequency plot comprises passing the pressure signals through a Fourier Transform to generate frequency readings associated with the pressure signals.

5. The method of claim 1, wherein identifying a fuel-flow split that produces a greatest positive impact on the highest-ranked parameter comprises:
   inspecting the one or more slopes to identify a slope that, upon adjusting the tuning values of the respective fuel-flow split, most expeditiously moves the highest-ranked ranked parameter to a prescribed range between the predetermined upper and lower limits; and
   recognizing a fuel-flow split corresponding to the identified slope.

6. The method of claim 1, wherein identifying a fuel-flow split that produces a least negative impact on a remainder of the identified parameters comprises:
   inspecting the one or more slopes to identify a group of slopes within a single graphical representation that, upon adjusting the tuning values of the respective fuel-flow split, minimally degrades the remainder of the identified parameters with respect to a prescribed range between the predetermined upper and lower limits; and
   recognizing a fuel-flow split corresponding to the identified group of slopes.

7. The method of claim 1, further comprising generating the graphical representations by a procedure comprising:
   plotting data points of the identified parameters exhibiting the out-of-tune condition against the tuning values for a fuel-flow split within the set of fuel-flow splits;
   forming the one or more slopes from the plotted data points; and
   overlaying the one or more slopes associated with a particular fuel-flow split.

8. The method of claim 7, wherein the fuel-flow split governs a portion of a total fuel-flow that is directed to a fuel nozzle of the combustor's fuel circuit.

9. The method of claim 1, further comprising verifying that the incremental adjusting to the selected fuel-flow split reduced the highest-ranked parameter to a prescribed range between the predetermined upper and lower limits.

10. The method of claim 9, wherein verifying comprises:
   pausing for a period of time to allow the identified parameters to stabilize;
   rerecording the pressure signals from the combustor; and
   determining whether the amplitudes derived from the pressure signals moves the identified parameters to prescribed ranges between the predetermined upper and lower limits.

11. The method of claim 10, further comprising, upon incrementally adjusting the selected fuel-flow split a predefined amount, regenerating the one or more slopes associated with the fuel-slow splits using the parameters identified as exhibiting an out-of-tune condition upon stabilizing.

12. The method of claim 11, further comprising ceasing incrementally adjusting the selected fuel-flow split upon determining that the highest-ranked parameter has moved to a prescribed range between the predetermined upper and lower limits.

13. The method of claim 12, wherein incrementally adjusting the selected fuel-flow split a predefined amount comprises applying a uniform amount of adjustment to the selected fuel-flow split.

14. The method of claim 12, incrementally adjusting the selected fuel-flow split a predefined amount comprises applying a varying amount of adjustment to the selected fuel-flow split.

15. The method of claim 1, wherein the combustor dynamics that include at least one of lean blow out, cold tone, hot tone, or screech.

16. A computerized method, implemented by a processing unit, for generating one or more slopes used to dynamically tune a combustor of a gas turbine (GT) engine, the method comprising:
   recording a plurality of operational conditions from the GT engine;
   determining that a first operational condition and a second operational condition of the plurality of operational conditions are outside a prescribed range;
   generating slopes for both the first and second operational conditions via a graphing process comprising:
      (a) constructing a first slope associated with a particular fuel-flow split within a set of fuel-flow splits by plotting data points derived from the first operational condition against tuning values associated with the fuel flow split;
      (b) constructing a second slope associated with the fuel-flow split by plotting data points derived from the second operational condition against the tuning values associated with the fuel flow split;
      (c) overlaying the first slope and the second slope to form a graphical representation associated with the fuel-flow split; and
      (d) repeating the graphing process for a remainder of the set of fuel-flow splits;
   compiling graphical representations associated with the set of fuel-flow splits, respectively, within a slopes schedule; and
   correcting the first and second operational conditions by employing the slopes schedule to select one of the set of fuel-flow splits for incremental adjustment.

17. The computerized method of claim 16, further comprising comparing the first and second operational conditions against a scanning order table to determine which one is highest ranked.

18. The computerized method of claim 17, wherein the scanning order table prioritizes the plurality of operational conditions and assigns a ranking to the operations conditions based on its priority.

19. The computerized method of claim 18, further comprising placing an enhanced importance on the first or second operational condition determined to be the highest ranked when employing the slopes schedule to select one of the set of fuel-flow splits for incremental adjustment.

20. One or more computer-readable media that, when invoked by computer-executable instructions, perform a method for dynamically auto-tuning a gas turbine (GT) engine, the method comprising:
   detecting that one or more operating parameters have overcome a threshold value, wherein the one or more detected parameters exhibit an out-of-tune condition upon overcoming the threshold value;
   comparing the one or more detected parameters against a scanning order table to determine which of the one or more detected parameters is first encountered within the scanning order table;
   selecting a fuel-flow split for adjustment as a function of the one or more detected parameters via a process comprising:
      (a) generating a set of slopes that are particular to a respective fuel-flow split, wherein a slope in the set of slopes corresponds with a respective detected parameter plotted against tuning values of the respective fuel-flow split; and
      (b) identifying a fuel-flow split that, upon incrementing its tuning values along the set of slopes, produces a greatest positive impact on the first encountered parameter and produces a least negative impact on a remainder of the one or more detected parameters; and
   initiating the adjustment of the selected fuel-flow split.

* * * * *